May 23, 1933. E. B. SPEAR ET AL 1,911,003
MANUFACTURE OF CARBON BLACK
Filed Oct. 7, 1925 2 Sheets-Sheet 2
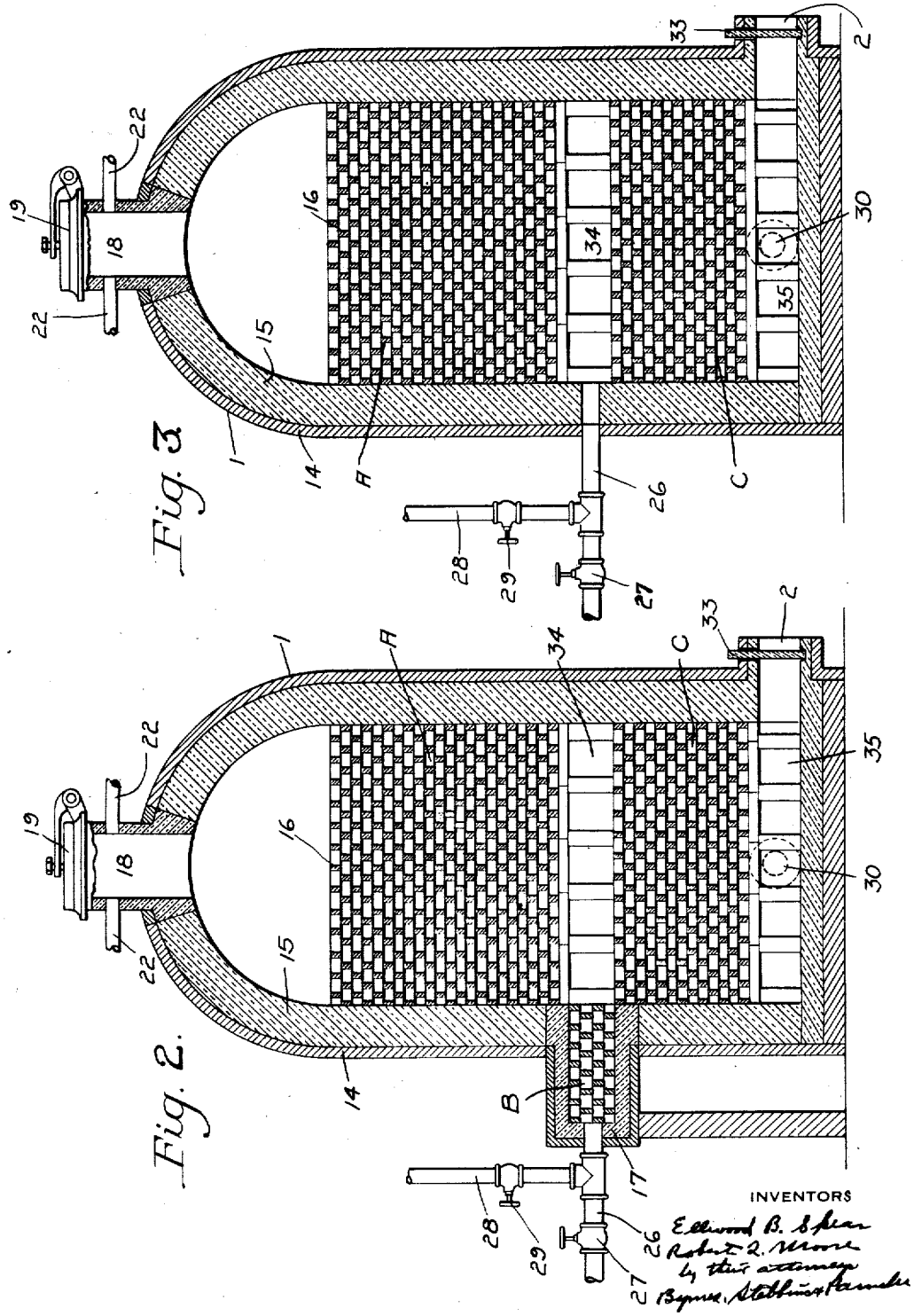

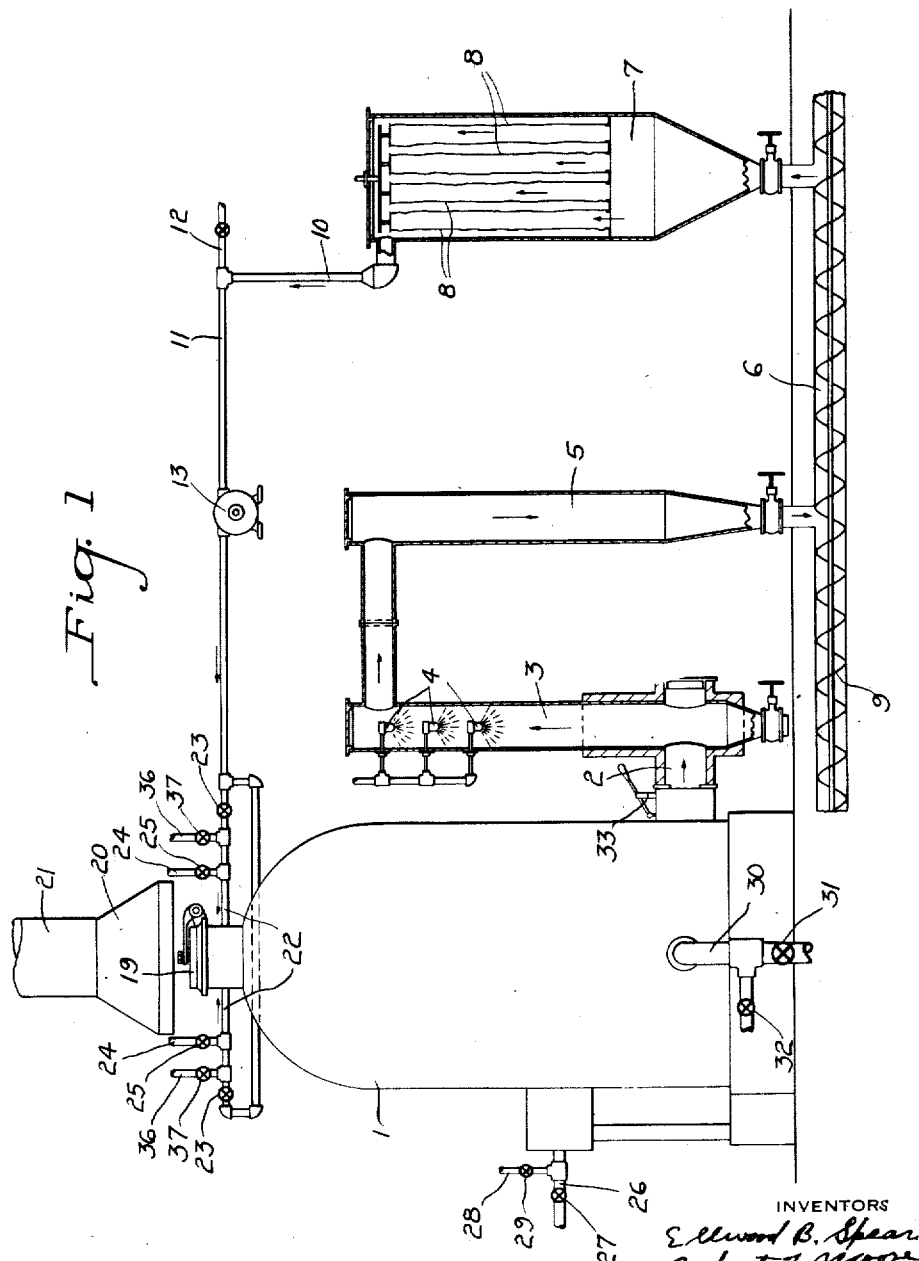

Patented May 23, 1933

1,911,003

UNITED STATES PATENT OFFICE

ELLWOOD B. SPEAR, OF PITTSBURGH, AND ROBERT L. MOORE, OF DORMONT, PENNSYLVANIA, ASSIGNORS TO THERMATOMIC CARBON COMPANY, OF PITTSBURGH, PENNSYLVANIA, A CORPORATION OF DELAWARE

MANUFACTURE OF CARBON BLACK

Application filed October 7, 1925. Serial No. 61,149.

The present invention relates to the manufacture of carbon black. Carbon black is a well known article of commerce and is used extensively as a pigment, as a filler for rubber compounding, and so forth. Carbon black has, until recent years, been produced almost exclusively by burning gas, such as natural gas, in a smoky flame against a cool metal surface upon which the carbon black was deposited and subsequently scraped off. The carbon black thus produced, and ordinarily known as channel black, is a fine, fluffy jet black powder composed of minute particles of carbon. Carbon black has also been made, in recent years, by burning a gas, such as natural gas, with an insufficient supply of air and collecting the soot-like carbon black produced by the incomplete combustion of the gas. Carbon black has also been produced by passing a gas, such as natural gas, through a highly preheated checkerwork retort in which the gas is thermally broken down to form carbon black which is separated from the gaseous stream as described, for example, in the Brownlee and Uhlinger Patent No. 1,520,115 of December 23, 1924. The carbon thus produced is described in the Brownlee and Uhlinger Patent No. 1,478,730 of Dec. 25, 1923 and is of a greater weight per unit volume than ordinary channel carbon black and has a grayish color. The greater weight and grayish color are apparently due to the greater length of time that the carbon remains in the heated retort. The carbon produced upon the initial decomposition of the gas has apparently the jet black color and other characteristics of the channel carbon black, but is converted into the grayish carbon of greater weight during the period of from 15 to 20 seconds that it remains in the heated retort before passing out to the cooling and collecting devices.

The yield of carbon made by the Brownlee and Uhlinger process is greater than by the usual process of making channel black, but the color has been objectionable for some uses.

In the process which we are about to describe the color of the carbon black may be fixed as desired. A jet black carbon black having the general physical characteristics of the usual commercial channel black may be produced and with a yield comparable to that of the Brownlee and Uhlinger process. Other characteristics of the carbon, particularly its effect when combined with rubber, may be varied by modifying our process as hereinafter described. Also, relatively pure hydrogen may be secured as a by-product if desired. Such hydrogen is a valuable by-product and may be used in the production of synthetic ammonia and fertilizers.

In carrying out the process, the gas, usually natural gas, is mixed with a preheated diluent gas, preferably hydrogen, which is preferably the hydrogen which remains after the carbon is removed from the natural gas and a portion of which is re-circulated as the diluent gas. The mixture of the hydrocarbon gas and diluent gas is further heated, preferably by passing through checkerwork or other heating means which may be burned out from time to time to remove deposited carbon. The hydrocarbon breaks down yielding carbon black which is rapidly swept through the reaction zone and may thus be obtained with a jet black color characteristic of the ordinary channel black.

In the drawings:

Figure 1 is an elevation taken partly in vertical section, showing more or less diagrammatically the preferred apparatus for carrying out the process.

Figure 2 is a vertical section through the heating retort; and

Figure 3 is a vertical section through a heating retort showing a modification.

Referring to the illustrated embodiment of the invention, reference numeral 1 indicates the heating retort in which the diluent gas is preheated and in which the decomposition of the hydrocarbon gas takes place. The gas which has been decomposed in the retort, and which consists principally of hydrogen with entrained carbon particles, passes through the outlet 2 into a chamber 3 into which water sprays 4 discharge to cool the gas. The gas is highly heated and converts the water into steam, the latent heat of evaporation serving to efficiently cool the gas. The gas then passes downwardly through a column 5 and along a conveyor passage 6 into the main separating chamber 7 where the gas passes through the fabric bags 8 which are shaken from time to time to dislodge the carbon. The carbon from the separator 7 and tower 5 falls into the conveyor passage 6 where it is pushed along to the right, as viewed in Figure 1, by means of the screw conveyor 9, to a bin, from which it is bagged. The gas from which the entrained carbon particles have been removed goes from the separator 7 into a discharge pipe 10 having two branches 11 and 12. The branch 11 leads back to the retort 1 through which the hydrogen gas may be recirculated. The branch 12 leads the excess hydrogen off where it may be utilized for any desired purpose, such as in the manufacture of ammonia, fertilizers, etc. The pipe 11 is preferably provided with a blower 13 for handling the hydrogen gas.

The above is a general description of the layout of the apparatus. The retort 1 and the reactions taking place therein will now be described in more detail.

The retort 1 has a steel casing 14 with a refractory heat insulating lining 15 preferably of firebrick. The chamber within the retort is filled, for the most part, with checkerwork 16 made of refractory brick. The checkerwork may be considered as divided into three parts or zones. First, the zone A, in which the diluent gas is preheated; second, the zone B, in which the hydrocarbon gas is preheated, and third, the zone C or reaction zone, in which the mixture of hydrocarbon gas and diluent gas is further heated and in which the hydrocarbon gas is decomposed.

The checkerwork constituting the zone B is formed in a lateral extension or pocket 17 of the retort. This heating zone may be omitted if desired, in which case the hydrocarbon gas is not preheated, as shown in Figure 3. The retort shown in Figure 3 is the same as that in Figure 2 but with the omission of the brickwork forming the gas preheating zone B.

The retort is provided with suitable connections for admitting and discharging the gases and products of combustion. The top of the retort is provided with a large discharge passage or chimney 18 through which the products of combustion are discharged during the heating blast. The opening 18 is closed by a stop valve 19 which discharges into a hood 20 through a stack 21 through the roof of the building. Two inlet pipes 22 enter the sides of the opening 18 to admit the diluent gas, or diluent gas mixed with air, if desired. The pipes 22 are connected through the valves 23 to the pipe 11, through which the hydrogen is drawn from the separator 7. Branch pipes 24 provided with valves 25 enter the pipes 22 and permit the introduction of air or other gas to be mixed with the hydrogen.

The hydrogen gas to be decomposed, which is usually natural gas, is admitted to the preheating zone B through pipe 26 provided with a controlling valve 27. A branch pipe 28 provided with a valve 29 enters the pipe 26 and permits the introduction of air or other gas to be mixed with the hydrocarbon gas before it passes into the heating zone B. At the bottom of the retort is an inlet pipe 30 through which is forced a mixture of air and gas for the purpose of applying a heating blast to the checkerwork intermittently and to burn out accumulated carbon deposits. The gas used for this purpose may be natural gas, or the excess hydrocarbon, or producer or other fuel gas. The supply of gas and air may be regulated by the valves 31 and 32 in the branch pipes leading to the inlet pipe 30.

The outlet passage 2 has a gate valve 33 which is closed when the heating blast is applied to the retort.

The upper checkerwork forming the diluent gas pre-heating zone A is separated from the lower checkerwork C by a relatively unobstructed zone 34 into which the hydrocarbon gas is discharged to mingle with the downwardly flowing diluent gas. The checkerwork forming the reaction zone C is supported on columns to leave another relatively unobstructed space 35 at the bottom of the retort from which the gas flows to the outlet passage 2.

The operation of the apparatus is as follows:—The checkerwork is first heated by applying a heating blast. During the blast the valves 23, 24 and 33 are closed to shut off the retort from the carbon collecting portion of the apparatus. The valves 31 and 32 are opened to admit a combustible mixture of gas through the pipe 30 to the bottom of the retort. The valves 27 and 29 are also opened to admit a smaller quantity of the combustible mixture to the checkerwork zone B in the retort in which such checkerwork is employed. The valve 19 is opened wide to allow the gases of combustion to pass off into the stack 21. The heating blast is maintained until the checkerwork is heated to the desired temperature. The checkerwork in the zone C is heated to a preferred temperature of about 1200° to 1400° C. The lower portion of the checkerwork zone A is heated to about this same temperature, although the upper portion of the zone A need not be heated to as high temperature. The gas admitted to heat the checkerwork zone B is regulated so that the checkerwork is heated to a temperature somewhat below the decomposition point of the hydrocarbon, preferably about 700° or 800° C. The temperature of the zone B may be prevented from rising above this temperature by forcing in an excess of cold air through the inlet pipe 26.

After the temperature in the three zones of the retort have reached the desired points, the blast is shut off and the discharge valve 19 closed. The valve 33 is then opened and the valves controlling the pipes 22 and 26 are also opened to introduce the diluent gas and the hydrocarbon gas. If the valves 23 and 27 are opened hydrogen, as the diluent gas, is forced into the top of the retort and flows down through the heating zone A and the hydrocarbon gas, preferably natural gas, is introduced through the pipe 26 and through the heating zone B in the form of retort shown in Figure 2. The hydrocarbon gas is preheated in the zone B to a point slightly below its decomposition temperature. The diluent gas flowing down through the heating zone A is, however, highly preheated to a temperature well above the decomposition temperature of the hydrocarbon gas. The hydrocarbon gas and diluent gas mix in the space 34 and the mixture passes downward through the reaction zone C, where the mixture is still further heated by the checkerwork C. When the hydrocarbon gas meets the highly preheated diluent gas, decomposition of the hydrocarbon gas into solid carbon particles and hydrogen begins, and this is further augmented by the additional heat supplied by the highly heated checkerwork C. During the passage of the mixture through the checkerwork zone C, some of the particles of the solid carbon come in contact with the checkerwork and become encrusted thereon. The remainder of the carbon, however, passes along with the current of gas and out through the discharge passage 2 and into the collecting apparatus, where it is separated from the gas. The volume of diluent gas is preferably several times that of the hydrocarbon gas, usually somewhere in the neighborhood of five volumes of diluent gas to one volume of hydrocarbon gas. The relatively large volume of diluent gas sweeps the mixture rapidly through the reaction zone C so that the carbon particles are not allowed to remain in this highly heated zone for but a very few seconds and the carbon black retains its jet black appearance and the graying of the carbon is prevented. The use of diluent gas also serves to desirably decrease the size of the carbon particles formed. When the hydrocarbon gas is diluted, there will be a greater number of condensation centers for a given weight of the resultant carbon and therefore the carbon particles will be smaller and a more valuable product obtained. The hydrocarbon passing through the heating zone B must not be heated above its decomposition temperature, otherwise the carbon will be deposited on the brickwork and undesirable intermediate products of a tarry nature will be formed. It is found, however, that the sudden heating of the hydrocarbon by its contact with the highly preheated diluent gas, together with the sudden heating to which the mixture is immediately exposed in its passage through the checkerwork zone C, greatly reduces or entirely eliminates the formation of undesirable tarry or oily products which might contaminate the collected carbon black.

As above noted, during the passage of the mixture through the checkerwork zone C, particles of solid carbon come in contact with the checkerwork and become encrusted thereon. In order to clean the checkerwork, a lean mixture of air and gas is forced through the pipe 30 during the blast so as to burn the encrusted carbon off the checkerwork of zone C, thus preventing the checkerwork from becoming clogged and also utilizing the fuel value of this carbon for heating the retort.

The character of the carbon may be controlled by varying the time of passage of the hydrocarbon gas through the reaction zone C. By using a relatively large volume of diluent gas the mixture may be swept rapidly through the reaction zone C and the jet black fluffy characteristics of the channel carbon black are retained. By using less diluent gas, or by lengthening the reaction zone C, the carbon black may be given more of the properties of thermatomic carbon, namely, a greater weight per unit volume and a tendency to a grayish color. The process, therefore, permits the variation in the character of carbon black produced.

Recirculated hydrogen is preferred as the diluent gas, since it is inert, and by the term "inert diluent gas" we mean a diluent gas which will not chemically combine with the hydrocarbon gas to any substantial extent, as by combustion. However, other inert diluent gases, such as nitrogen or carbon dioxide, may be used, or gases such as air may be used as the diluent. The hydrogen, however, is preferred, since it is a by-product from the process. Moreover, the gas as it leaves the retort is not entirely decomposed, and while it consists principally of hydrogen, it usually contains a small amount of undecomposed hydrocarbon gas. When this gas is again recirculated as a diluent gas the residual undecomposed hydrocarbon gas again goes through the retort, and is further decomposed, thus giving the maximum recovery from the original gas.

In the form of retort shown in Figure 2 the hydrocarbon gas is preheated to a point just below its decomposition temperature by the checkerwork of the heating zone B, while in the form of retort shown in Figure 3 the hydrocarbon gas is introduced without preheating into the diluent gas. The apparatus may be operated satisfactorily in either way, particularly where a large volume of diluent gas is used, since the highly preheated diluent gas will raise the cold hydrocarbon gas above its decomposition temperature and the heating will be further augmented by the checkerwork zone C. The hydrocarbon gas, moreover, may be preheated by some partial combustion if air is bled into the gas through the branch pipe 28.

The partial combustion caused by the introduction of air serves to quickly raise the temperature and tends to still further prevent or minimize the production of tarry or oily matter and other undesirable substances which might otherwise contaminate the collected carbon black.

When the hydrogen is subsequently used, as for example, in the manufacture of synthetic ammonia or fertilizers, it is desirable that it should be as free as possible from contaminating gases, such as carbon dioxide and carbon monoxide. Under such conditions it is, therefore, desirable to use hydrogen alone as the diluent gas. However, under some conditions it may be desirable to bleed in a certain amount of air. This may be done by admitting air through the branch pipes 24 to be mixed with the diluent gas entering the retort. Or air may be introduced through the branch pipe 28 to mix with the hydrocarbon gas entering through the inlet pipe 26. When air is admitted, combustion takes place, increasing the temperature of the gases and retarding the chilling of the checkerwork by the mixture of the air and hydrogen, or the mixture of the air and hydrocarbon gas.

When air is admitted, oxygen combines with the hydrogen or with the hydrocarbon gas to form superheated steam. This steam has a marked influence upon certain properties of the carbon black. It apparently serves to burn out the hydrocarbons present in the carbon thus activating the carbon. The degree of activation can be controlled by the amount of steam produced by the bleeding in of the air.

The carbon produced with air bleeding has a much greater stiffening effect when combined with rubber than the carbon black produced by the Brownlee and Uhlinger process. Its rubber-stiffening qualities are comparable with those of ordinary commercial carbon black, but may be controlled since the rubber-stiffening qualities are apparently dependent upon the degree of activation of the carbon. The carbon black produced without the bleeding in of air has rubber-stiffening qualities comparable with the carbon black of the Brownlee and Uhlinger process and may be employed to advantage for soft stock, such as frictions for belts and pneumatic tires.

Other modifications may be made in the process. For example, when the gaseous decomposition products of the hydrocarbon gas are used as the diluent gas, the checkerwork zone C may be made much smaller or entirely eliminated. In this case a relatively large volume of the diluent gas is highly preheated and furnishes sufficient heat for a substantial decomposition of the hydrocarbon gas which is mixed with it, the hydrocarbon gas being also preferably preheated to just below its decomposition point. The decomposition gases are readily available in sufficient quantities to furnish the volume of preheated gas necessary to decompose the hydrocarbon gas. Moreover, any undecomposed hydrocarbon gas in the re-circulated diluent gas is again exposed to the heat in the retort. This modified process may be carried out in the retort shown by introducing the hydrocarbon gas at the very bottom of the retort, as, for example, through the pipe 30, and utilizing all of the brick work within the body of the retort for preheating the re-circulated diluent gas. Or, if desired, the checkerwork below the pipe 26 through which hydrocarbon gas is introduced may be taken out and the space thus provided below the heating zone A utilized as the mixing and reaction chamber in which the decomposition of the hydrocarbon gas takes place.

Another modification of the process and one which has been found to produce an excellent grade of carbon is the mixing of the diluent gas and the hydrocarbon before they are heated. In carrying out such process, instead of admitting the hydrocarbon gas through the pipe 26, it may be admitted into the top of the retort through the pipes 22 by means of branch inlet gas supplying pipes 36 controlled by valves 37. In this case the hydrocarbon gas and diluent gas are mixed before they pass to the heated checkerwork of the retort. Decomposition in this case begins to take place at the top of the zone A and continues as the gases pass downward through the retort. The diluent gas which is mixed with the hydrocarbon gas is preferably the gaseous products of decomposition from previously treated hydrocarbon gas. However, air may be added along with such decomposition products, or air alone may be used as the diluent gas to be mixed with the hydrocarbon gas before they are heated to decompose the hydrocarbon gas. In case air is used, the supply must be limited so that only a limited partial combustion can take place. While the air tends to burn up some of the gas, it has an advantage in tending to raise the temperature of the cold mixture by partial combustion before the mixture passes into the hot checkerwork, thus preventing rapid chilling of the checker.

The process gives a large production of carbon from the hydrocarbon gas, such as natural gas, and at the same time permits the control of the character of the carbon black produced, yielding carbon black of the desired quality. The apparatus is economical to operate, the heat losses are reduced to the minimum, and the clogging of the passages and checkerwork is prevented.

While we have described the preferred embodiment of our invention in considerable detail, it is to be understood that the invention is not limited to its preferrred and described embodiments, but may be otherwise embodied within the scope of the following claim.

We claim:

Apparatus for the production of carbon black, comprising a retort having a chamber containing three zones of refractory checker work, means for periodically applying a heating blast to heat the several zones of checker work, means for passing a diluent gas through the first zone, means for passing the hydrocarbon gas to be decomposed through the second zone and for mixing the thus preheated gases and for passing the mixture through the third zone to further heat the mixture, whereby the hydrocarbon gas is decomposed into gaseous decomposition products and solid carbon particles, and means for separating the carbon particles from the gaseous decomposition products.

In testimony whereof we have hereunto set our hands.

ELLWOOD B. SPEAR.
ROBERT L. MOORE.

CERTIFICATE OF CORRECTION.

Patent No. 1,911,003.   May 23, 1933.

ELLWOOD B. SPEAR, ET AL.

It is hereby certified that error appears in the printed specification of the above numbered patent requiring correction as follows: Page 2, line 66, for "hydrogen" read "hydrocarbon"; and that the said Letters Patent should be read with this correction therein that the same may conform to the record of the case in the Patent Office.

Signed and sealed this 22nd day of August, A. D. 1933.

M. J. Moore.

(Seal)   Acting Commissioner of Patents.

minimum, and the clogging of the passages and checkerwork is prevented.

While we have described the preferred embodiment of our invention in considerable detail, it is to be understood that the invention is not limited to its preferrred and described embodiments, but may be otherwise embodied within the scope of the following claim.

We claim:

Apparatus for the production of carbon black, comprising a retort having a chamber containing three zones of refractory checker work, means for periodically applying a heating blast to heat the several zones of checker work, means for passing a diluent gas through the first zone, means for passing the hydrocarbon gas to be decomposed through the second zone and for mixing the thus preheated gases and for passing the mixture through the third zone to further heat the mixture, whereby the hydrocarbon gas is decomposed into gaseous decomposition products and solid carbon particles, and means for separating the carbon particles from the gaseous decomposition products.

In testimony whereof we have hereunto set our hands.

ELLWOOD B. SPEAR.
ROBERT L. MOORE.

CERTIFICATE OF CORRECTION.

Patent No. 1,911,003.   May 23, 1933.

ELLWOOD B. SPEAR, ET AL.

It is hereby certified that error appears in the printed specification of the above numbered patent requiring correction as follows: Page 2, line 66, for "hydrogen" read "hydrocarbon"; and that the said Letters Patent should be read with this correction therein that the same may conform to the record of the case in the Patent Office.

Signed and sealed this 22nd day of August, A. D. 1933.

(Seal)

M. J. Moore.
Acting Commissioner of Patents.

CERTIFICATE OF CORRECTION.

Patent No. 1,911,003.  May 23, 1933.

ELLWOOD B. SPEAR, ET AL.

It is hereby certified that error appears in the printed specification of the above numbered patent requiring correction as follows: Page 2, line 66, for "hydrogen" read "hydrocarbon"; and that the said Letters Patent should be read with this correction therein that the same may conform to the record of the case in the Patent Office.

Signed and sealed this 22nd day of August, A. D. 1933.

M. J. Moore.

(Seal)  Acting Commissioner of Patents.